July 4, 1961 W. R. LUNDRY 2,991,425
DELAY NETWORK
Filed Oct. 26, 1959
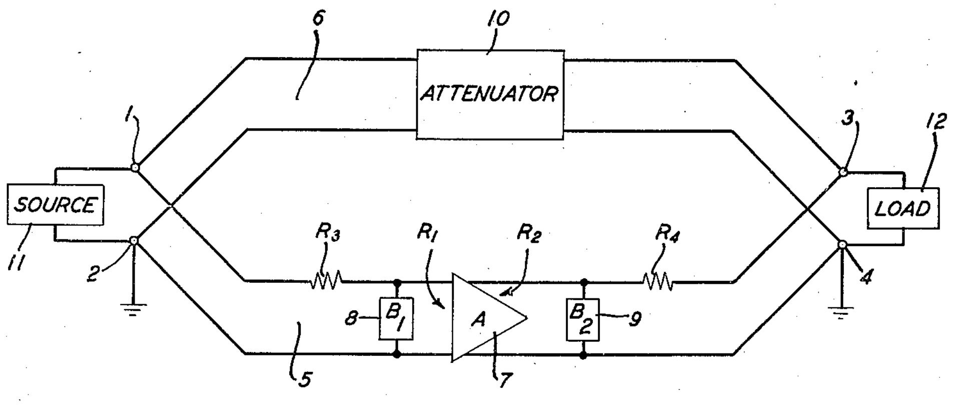
INVENTOR
W. R. LUNDRY
BY
Ralph P. Holcomb
ATTORNEY 2,991,425
Patented July 4, 1961

2,991,425

DELAY NETWORK

Walter R. Lundry, Summit, N.J., assignor to Bell Telephone Laboratories, Incorporated, New York, N.Y., a corporation of New York Filed Oct. 26, 1959, Ser. No. 848,675
5 Claims. (Cl. 330—107)

This invention relates to wave transmission networks and more particularly to delay networks.

An object of the invention is to introduce a desired delay-versus-frequency characteristic into a wave transmission path. A further object is to reduce the number of component elements required for a given delay characteristic, especially when the delay-bandwidth product is large.

A delay network which has a large delay-bandwidth product requires a correspondingly large number of component inductors and capacitors. Such a characteristic may be obtained by using a sufficient number of constant-resistance, 360-degree, all-pass, passive sections connected in tandem, but this method is wasteful of elements. The number of elements may be reduced by placing all of the reactors in a single, two-terminal impedance branch and adding an active element to the network. But the values of the inductances and the capacitances must be held to closer limits as the number of elements used in a single branch increases, thus adding to the manufacturing cost. A point is reached when a second delay network, requiring another active element, must be added if the delay-bandwidth product is to be further increased.

In accordance with the present invention, the maximum delay-bandwidth product obtainable in a network using a single active element is doubled by dividing the reactive impedance branch and putting one part at each end of an amplifier. The resulting network comprises two transmission paths connected in parallel between a pair of input terminals and a pair of output terminals. One of the paths includes an amplifier with a series resistor and a reactive impedance branch connected at each end. Both reactive branches may be connected in shunt with the path, both in series, or one in shunt and the other in series. The susceptance of each reactive branch has one or more poles and one or more zeroes at critical frequencies, and the critical frequencies correspond in the two susceptances. If both reactive branches are in series or both in shunt with the path, the poles in each susceptance correspond in frequency with the zeroes in the other. If one of the reactive branches is in series and the other in shunt with the path, the poles in the two susceptances correspond and the zeroes in the two correspond. The second path has a transmission loss which is approximately 12 decibels greater than that in the first path when the reactive impedance branches are removed. The relative stiffnesses of the reactances are so chosen with respect to the resistances of the resistors and the input and output impedances of the amplifier that the transmission loss of the network is substantially constant with frequency.

The nature of the invention and its various objects, features, and advantages will appear more fully in the following detailed description of a typical embodiment illustrated in the accompanying drawing, the single figure of which is a schematic circuit of a delay network in accordance with the invention.

The network comprises a pair of input terminals 1—2 and a pair of output terminals 3—4 connected by two parallel transmission paths 5 and 6. The paths 5 and 6 are unbalanced and the terminals 2 and 4 may be grounded, as shown. The path 5 includes two resistors of value $R_3$ and $R_4$ connected in series between the terminals 1 and 3, an amplifier 7 interposed between the resistors, and two reactive impedance branches 8 and 9 connected at the respective ends of the amplifier. The branches 8 and 9 are shown connected in shunt with the path 5. This arrangement is preferred because one side may be grounded. However, as mentioned above, both of the branches 8 and 9 may be connected in series with the path 5, or one in series and the other in shunt. The path 6 includes an attenuator 10, which may be a T of resistors or, in its simplest form, a single series resistor.

A source 11 of alternating-current signals to be delayed is connected to the input terminals 1—2. A suitable load 12, which may include a summing amplifier, is connected to the output terminals 3—4. For best performance of the network, it is necessary either that the impedance of the source 11 be low compared to $R_3$, or that the impedance of the load 12 be low compared to $R_4$. Preferably, both of these relationships are present.

The reactive branches 8 and 9 have susceptances $B_1$ and $B_2$, respectively, each with one or more zeroes and one or more poles located at critical frequencies. The critical frequencies of $B_1$ correspond with those of $B_2$. The locations of these zeroes and poles are determined by the desired delay-frequency characteristics of the network. For the shunt connection shown, the zeroes of each susceptance approximately coincide with the poles of the other susceptance. The delay characteristic may be adjusted conveniently by adjusting the poles of both susceptances. The stiffness, or impedance level, of the susceptance $B_1$ depends upon the desired delay characteristic and also upon $R_3$ and $R_1$, the input impedance of the amplifier 7. Therefore, $R_1$ and $R_3$ may generally be so chosen that the inductors and capacitors required for the branch 8 will have convenient values. When $B_1$ has thus been determined, $B_2$ may be found from the relationship $$B_1B_2=\frac{-(R_1+R_3)(R_2+R_4)}{R_1R_2R_3R_4} \quad (1)$$

where $R_2$ is the output impedance of the amplifier 7. Disregarding the flat loss or gain, the transmission function of the over-all network on a normalized basis is given by the expression $$e^{-\theta}=\left(\frac{1-jB_1}{1+jB_1}\right)^2 \quad (2)$$

assuming that the component reactors in the branches 8 and 9 are dissipationless. It is thus seen that ideally the transmission loss of the network is constant at all frequencies, regardless of the value of $B_1$. In practice, the loss will be substantially flat with frequency when the component reactors have a high ratio of reactance to effective resistance. As this ratio decreases, small ripples of loss appear.

The amplifier 7 has a substantially constant phase shift of $\pi$ radians throughout the band of interest. Also, because it is a one-way device, the amplifier serves to isolate the branches 8 and 9 from each other.

One further relationship is required in order that the over-all network will have a substantially constant transmission loss. The loss in the path 6 must be approximately 12 decibels greater than the loss in the path 5 measured with the reactive branches 8 and 9 removed. Stated conversely, the path 5 must have a gain 12 decibels greater than that of the path 6. For example, the path 6 may have a loss of three decibels, furnished by the attenuator 10, and the path 5 a gain of nine decibels, provided by the amplifier 7.

The over-all flat loss of the network is approximately equal to the loss in the path 6 and therefore, in this example, is about three decibels. The over-all phase shift $\beta$ on a normalized basis may be found from the relationship $$\beta = 4 \tan^{-1} B_1 \quad (3)$$

The impedance branches 8 and 9 may have any suitable form. For example, each may be made up of series-resonant circuits connected in parallel, or antiresonant loops connected in series.

It is to be understood that the above-described arrangements are only illustrative of the application of the principles of the invention. Numerous other arrangements may be devised by those skilled in the art without departing from the spirit and scope of the invention.

What is claimed is:

1. A wave transmission network comprising two parallel transmission paths, one of the paths comprising two series resistors, an interposed amplifier, and two reactive impedance branches connected at the respective ends of the amplifier, the susceptance of each of the branches having a zero and a pole at critical frequencies, the critical frequencies corresponding in the two susceptances, the one path having a transmission gain approximately 12 decibels greater than that of the other path when the reactive branches are removed, and the susceptances of the reactive branches being so related to each other and to the values of the resistors and the input and output impedances of the amplifier that the transmission loss of the over-all network is substantially constant with frequency.

2. A wave transmission network comprising two parallel transmission paths, one of the paths comprising two series resistors, an interposed amplifier, and two reactive impedance branches connected at the respective ends of the amplifier, the susceptance of each of the branches having a plurality of zeroes and a plurality of poles, the zeroes of each susceptance approximately corresponding in frequency with the poles of the other susceptance, the other path including an attenuator and having a transmission loss approximately 12 decibels greater than that of the one path when the reactive branches are removed, and the susceptances of the reactive branches being so related to each other and to the resistances of the resistors and the input and output impedances of the amplifier that the network has a substantially flat loss.

3. A wave transmission network comprising two parallel transmission paths, one of the paths including an attenuator, the other path comprising two series resistors, an interposed amplifier, and two reactive impedance branches connected in shunt at the respective ends of the amplifier, the susceptance of each of the branches having a plurality of zeroes and a plurality of poles, the zeroes of each susceptance approximately corresponding in frequency with the poles of the other susceptance, the other path having a transmission gain approximately 12 decibels greater than that of the one path when the shunt reactive branches are removed, and the product of the susceptances of the reactive branches being so related to the values of the resistors and the input and output impedances of the amplifier that the network has an approximately constant transmission loss.

4. A delay network comprising two transmission paths between a pair of input terminals and a pair of output terminals, one of the paths comprising two series resistors, an interposed amplifier having a phase shift of $\pi$ radians, and two reactive impedance branches connected in shunt at the respective ends of the amplifier, the susceptance of each of the branches having a plurality of zeroes and a plurality of poles, the zeroes of each susceptance approximately corresponding in frequency with the poles of the other susceptance, the other path including an attenuator and having a transmission loss approximately 12 decibels greater than that of the one path when the two reactive branches are removed, and the product of the two susceptances being so related to the resistances of the resistors and the input and output impedances of the amplifier that the network has a transmission loss characteristic which is substantially flat with frequency.

5. A delay network comprising two transmission paths connected between a pair of input terminals and a pair of output terminals, one of the paths comprising an amplifier having an input impedance $R_1$ and an output impedance $R_2$, two reactive impedance branches having susceptances $B_1$ and $B_2$ connected in shunt at the respective ends thereof, and two resistors of value $R_3$ and $R_4$ connected in series at the input and output ends, respectively, of the amplifier, and the other path having a constant transmission loss approximately 12 decibels greater than the loss in the one path when the shunt impedances are removed, in which $$B_1 B_2 = \frac{-(R_1 + R_3)(R_2 + R_4)}{R_1 R_2 R_3 R_4}$$

References Cited in the file of this patent

UNITED STATES PATENTS

| | | |
|---|---|---|
| 2,566,876 | Dome | Sept. 4, 1951 |
| 2,859,414 | Lundry | Nov. 4, 1958 |